United States Patent
Thomas

(10) Patent No.: US 7,322,626 B2
(45) Date of Patent: Jan. 29, 2008

(54) VEHICLE DRIVE SECURITY SCREEN

(76) Inventor: Colin Thomas, 14 Dover Court, Dover Gardens, South Australia (AU) 5048

( * ) Notice: Subject to any disclaimer, the term of this patent is extended or adjusted under 35 U.S.C. 154(b) by 108 days.

(21) Appl. No.: 10/561,066

(22) PCT Filed: Jun. 18, 2004

(86) PCT No.: PCT/AU2004/000792

§ 371 (c)(1),
(2), (4) Date: Dec. 16, 2005

(87) PCT Pub. No.: WO2004/113133

PCT Pub. Date: Dec. 29, 2004

(65) Prior Publication Data

US 2006/0175856 A1    Aug. 10, 2006

(30) Foreign Application Priority Data

Jun. 20, 2003  (AU) .............................. 2003903130

(51) Int. Cl.
*E06B 9/00* (2006.01)

(52) U.S. Cl. .................................................... 296/24.3

(58) Field of Classification Search ............... 296/24.3, 296/24.4, 24.42, 24.43, 24.46; 160/130, 160/135, 181, DIG. 2
See application file for complete search history.

(56) References Cited

U.S. PATENT DOCUMENTS

| | | | | |
|---|---|---|---|---|
| 3,510,164 A | * | 5/1970 | Setina | 296/24.46 |
| 3,666,313 A | * | 5/1972 | Halstead et al. | 296/24.46 |
| 3,667,801 A | * | 6/1972 | Setina | 296/24.46 |
| 4,015,875 A | * | 4/1977 | Setina | 296/24.46 |
| D246,304 S | * | 11/1977 | Horn | D12/195 |
| D253,765 S | * | 12/1979 | Roggin | D12/195 |
| 4,227,735 A | * | 10/1980 | Joyner | 296/24.46 |
| 4,960,293 A | * | 10/1990 | Bottinick et al. | 280/749 |
| D352,140 S | * | 11/1994 | Easton et al. | D30/156 |
| 6,250,634 B1 | * | 6/2001 | Strain et al. | 273/395 |
| 6,669,259 B2 | * | 12/2003 | Murray et al. | 296/24.46 |
| 6,827,382 B2 | * | 12/2004 | Murray et al. | 296/24.46 |

* cited by examiner

*Primary Examiner*—H Gutman
(74) *Attorney, Agent, or Firm*—Francis Law Group

(57) ABSTRACT

A vehicle driver security screen and in particular a screen that seeks to minimize access to the driver's area of a vehicle such as a taxi cab or bus from side or rear attempts by passengers to access the driver area in an assault or robbery situation. The security screen is removably attached to the driver's seat in a way that does not restrict the movement of the driver's seat, nor restrict the driver's access or escape from the vehicle. The present invention is useful for drivers of public transport who are regularly exposed to aggressive behavior from passengers. The security screen provides protection to the head and torso regions of the driver while allowing contact with the passengers, such as when money is exchanged. Furthermore, the security screen provides protection to the driver from rear knife attack.

17 Claims, 9 Drawing Sheets

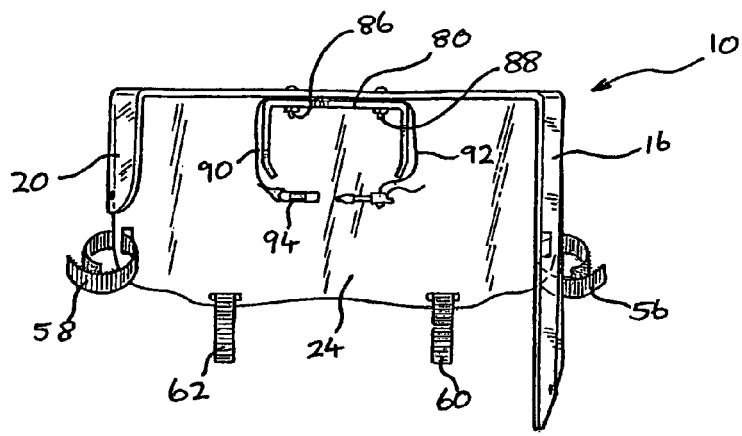
Fig 2c
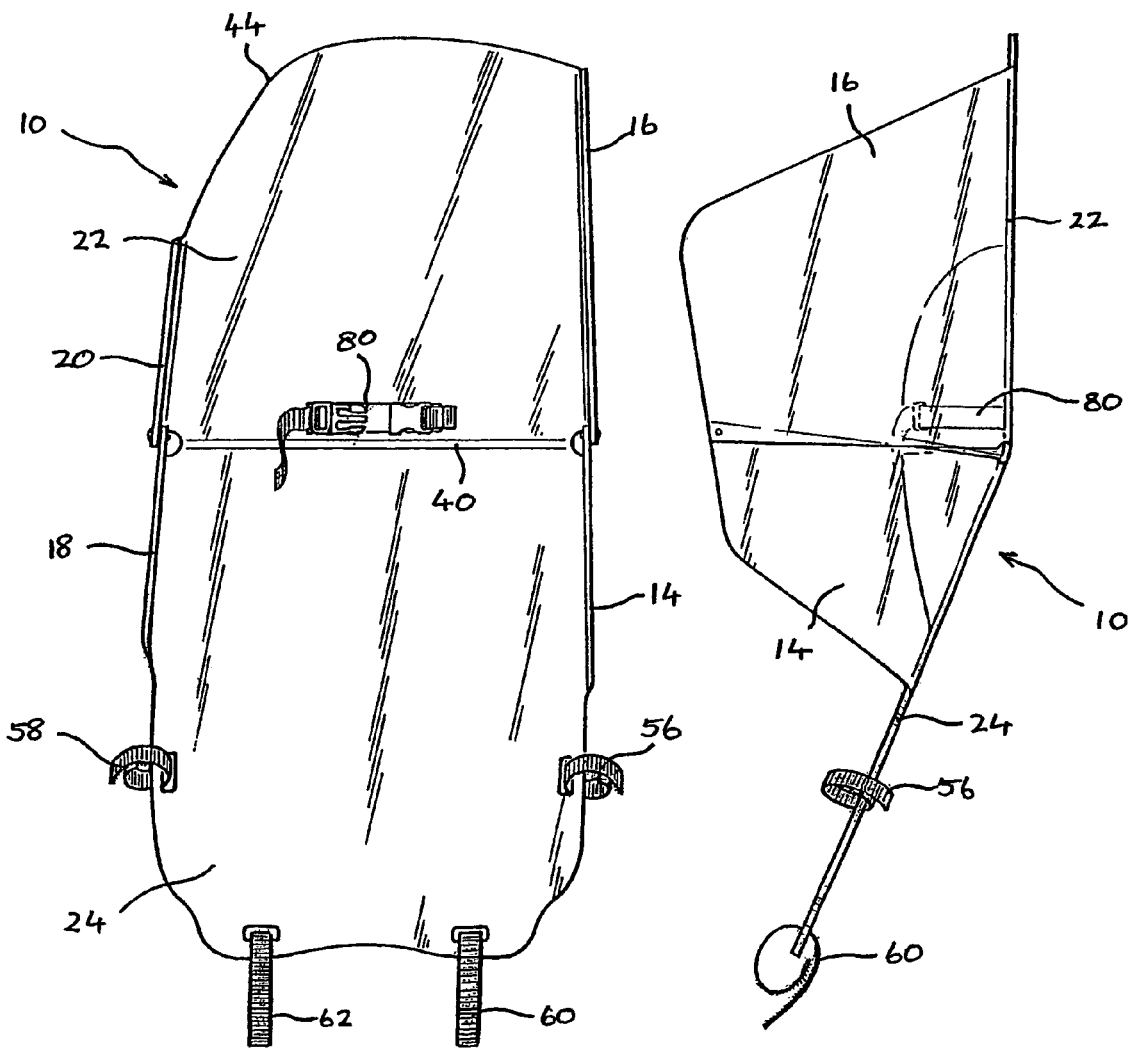
Fig 2a  Fig 2b

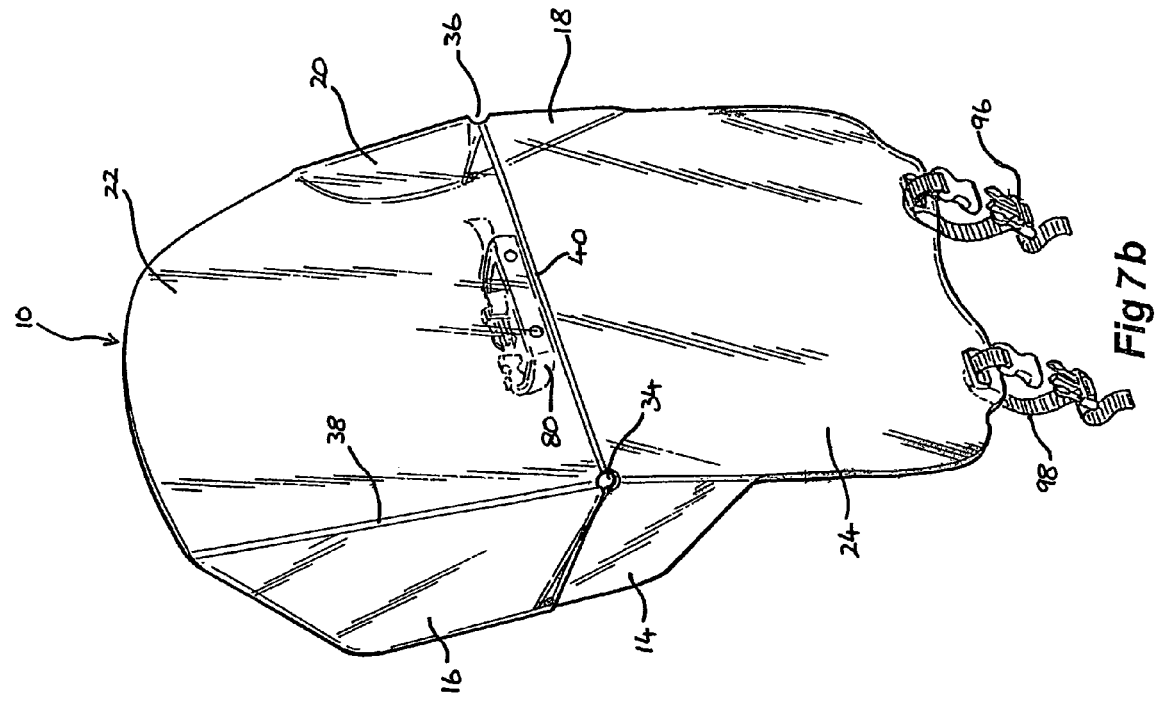
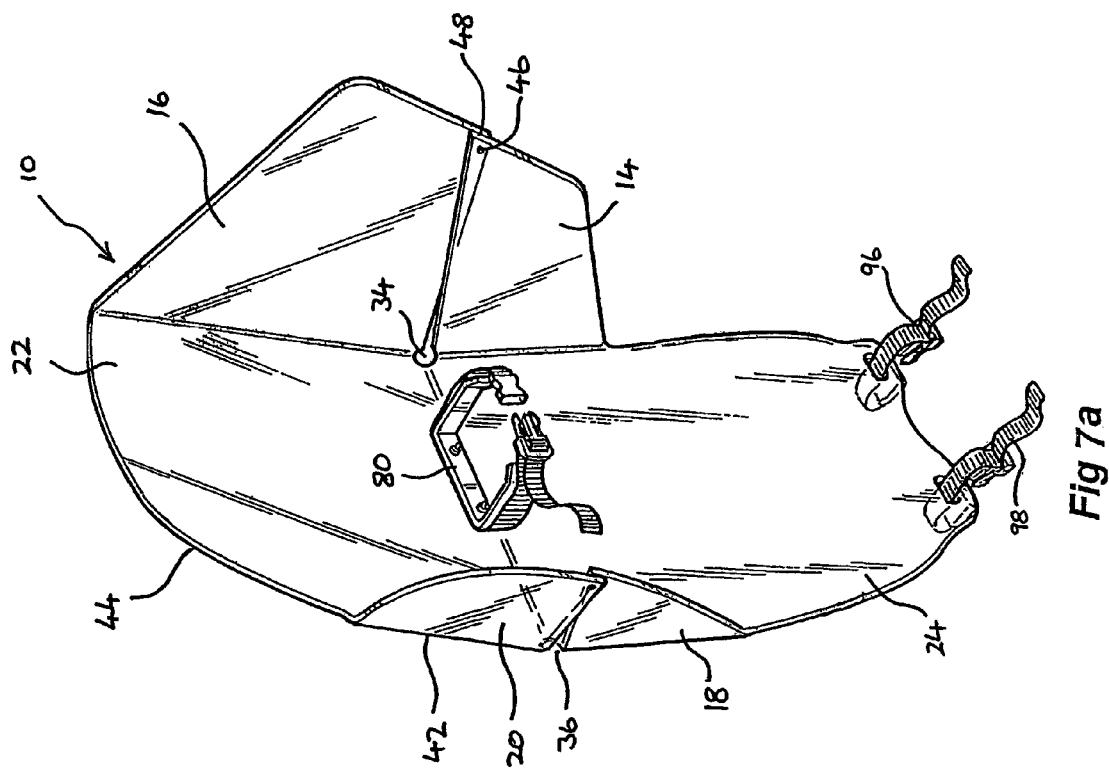
Fig 7b
Fig 7a

VEHICLE DRIVE SECURITY SCREEN

This application is filed pursuant to 35 U.S.C. § 371 as a United States National Phase Application of International Application No. PCT/AU04/000792, filed Jun. 18, 2004, which claims priority from Australia Application No. AU 2003903130, filed Jun. 20, 2003.

FIELD OF THE PRESENT INVENTION

The present invention relates to a vehicle driver security screen and in particular to a screen that seeks to minimise access to the driver's area of a vehicle such as a taxi cab or bus from side or rear attempts by passengers to access the driver area in an assault or robbery situation.

BACKGROUND OF THE INVENTION

Unfortunately, it is often the case that drivers of public transport vehicles such as taxi cabs and buses are prone to assault by side or rear passengers of the vehicle in an attempt to steal from the driver or obtain a free fare, amongst other reasons.

Various remedies to this known problem have been proposed. The use of security cameras mounted within vehicles is now commonplace and these provide some assurance to the driver that activities within the vehicle are being monitored. However, security cameras of this type can be quite sophisticated and therefore their cost quite substantial. Furthermore, the use of security cameras although known to be relatively effective in obtaining the identity of perpetrators, does not provide instant protection for the driver in an assault situation.

Protection barriers have also been proposed. However, these are often quite cumbersome units and are not easily retrofitted into existing vehicles. In addition, existing barriers often cause discomfort to the driver of the vehicle and do not allow for sufficient contact and communication between the driver and passengers. Various known barriers also do not provide specific protection to the vital areas of the driver such as the head and torso regions.

It is therefore an object of the present invention to overcome at least some of the aforementioned problems or to provide the public with a useful alternative.

SUMMARY OF THE INVENTION

Therefore in one form of the invention there is proposed a security screen adapted to be attached to a front seat of a vehicle of the type including a base, backrest and headrest, said security screen including: a lower rear planar section and an adjoining upper rear planar section, the plane of the upper section being different to the lower section; said lower rear section having two opposing side barriers extending forwardly from an upper end of said lower rear section; said upper rear section having two opposing side barriers extending forwardly above said lower rear section side barriers; and at least one attachment means adapted to removably and securably attach said security screen to said seat.

In preference said upper section extends upwardly at a greater vertical angle than said lower rear section.

In preference said at least a potion of the upper and lower section side barriers overlap, said security screen further including a securing means to secure said overlapping side barriers to each other. This increases the total strength of the security screen.

In preference said security screen is attached to the rear of said seat in a way that said rear panel makes contact with a rear surface of said seat.

In preference said security screen when attached to said seat does not restrict the movement of said seat.

In preference said upper rear section extends to just below the ceiling of said vehicle.

In preference said attachment means includes a C-section member adapted to engage said headrest.

In preference said C-section member includes a tether adapted to secure said C-section member to said headrest.

In preference said security screen includes a second attachment means adapted to engage a first frame of said seat said first frame connecting said base and rear portions of said seat.

In preference said security screen includes a third attachment means adapted to engage a second frame of said seat said second frame located below said seat.

In preference said attachment means includes a hook and tape connection.

In preference said attachment means includes a snap-fit connection.

BRIEF DESCRIPTION OF THE DRAWINGS

The accompanying drawings, which are incorporated in and constitute a part of this specification, illustrate several implementations of the invention and, together with the description, serve to explain the advantages and principles of the invention. In the drawings.

FIG. 1b is a schematic rear perspective view of the vehicle driver security screen of FIG. 1a;

FIG. 2a is a front plan view of the vehicle driver security screen of FIGS. 1a-b;

FIG. 2b is a side plan view of the vehicle driver security screen of FIG. 1a-b;

FIG. 2c is a top plan view of the vehicle driver security screen of FIGS. 1a-b;

FIG. 7a is a schematic perspective view of the front of the vehicle driver security screen including alternate connection means;

FIG. 7b is a schematic perspective view of the rear of the vehicle driver security screen including alternate connection means;

FIG. 8b is a schematic rear perspective view illustrating the rear of the vehicle driver security screen of FIG. 8a;

DESCRIPTION OF THE PREFERRED EMBODIMENTS

Figure 1B:
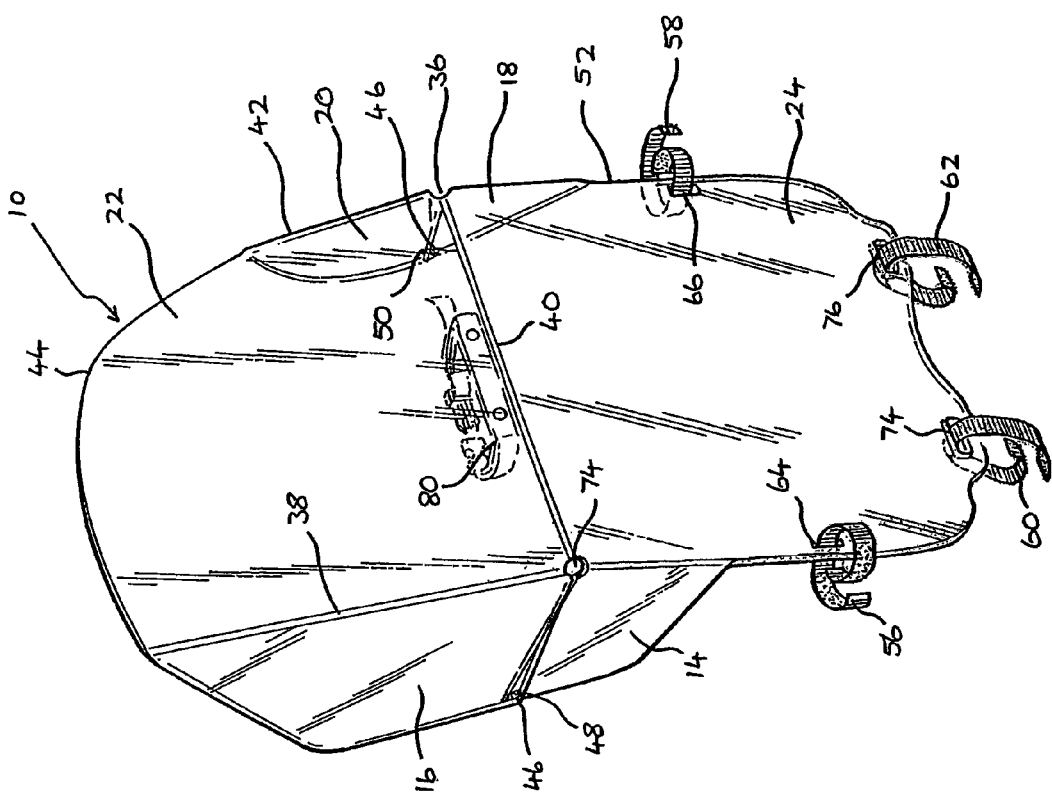

The following detailed description of the invention refers to the accompanying drawings. Although the description includes exemplary embodiments, other embodiments are possible, and changes may be made to the embodiments described without departing from the spirit and scope of the invention. Wherever possible, the same reference numbers will be used throughout the drawings and the following description to refer to the same and like parts.

The present invention discloses a vehicle driver security screen 10 that seeks to minimise side and rear access to a driver 12 of a vehicle (not shown). An example in which the screen 10 may prove necessary is where a passenger or passengers (not shown) wish to access the driver area in order to assault the driver 12. In one form of the invention the screen 10 includes six major panels 14, 16, 18, 20, 22, and 24. As illustrated in FIG. 1a the security screen 10 can be constructed from a single sheet 26 of material which includes creases 28 that define at least one edge of panels 14, 16, 18, 20, 22, and 24. The material can be constructed from any transparent material that does not restrict the vision of the driver 12. Panels 14 and 16 protect the driver 12 from side access while panels 18, 20, and 22 prevent rear access to the driver 12. The screen 10 is designed like so because the most serious and often fatal attacks to drivers of public transport vehicles occur to the head and torso regions of the driver 12. The screen 10 can be retrofitted onto existing vehicle seats 30 and attached via simple connection means 32 in such a way that the screen 10 does not restrict the movement of the seat 30.

Figure 1A:
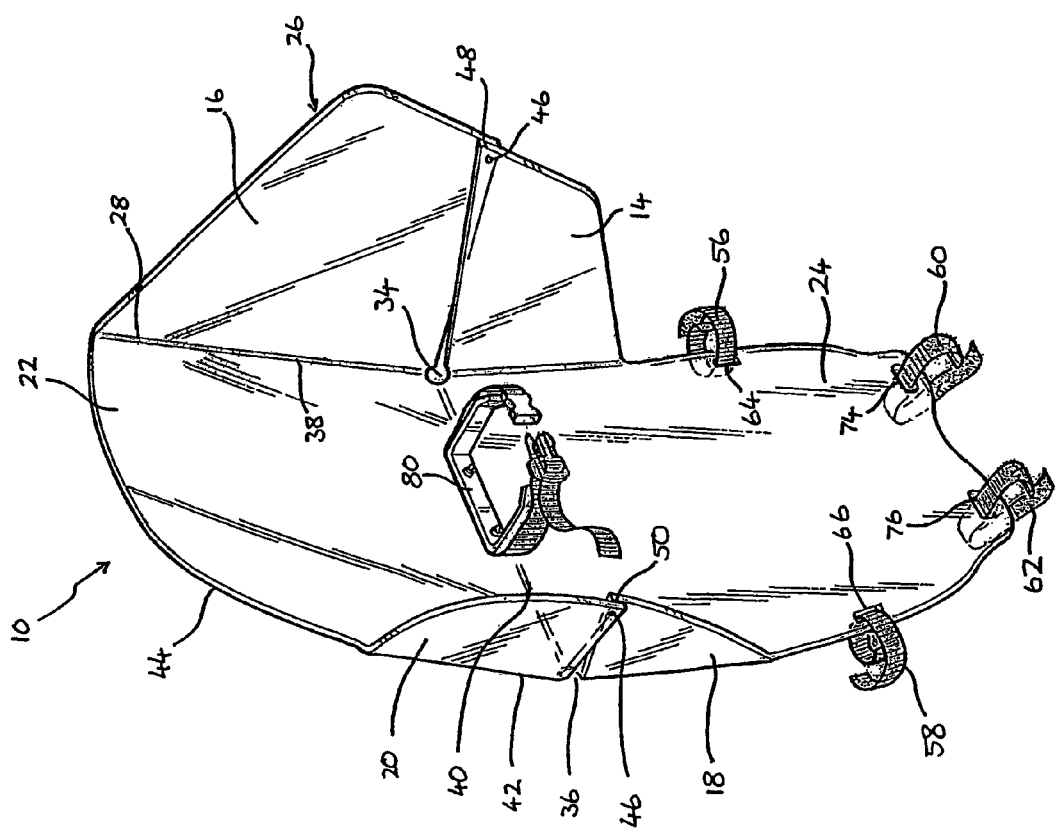
FIG. 1a is a schematic front perspective view illustrating a vehicle driver security screen in accordance with the present invention.
Figure 3:
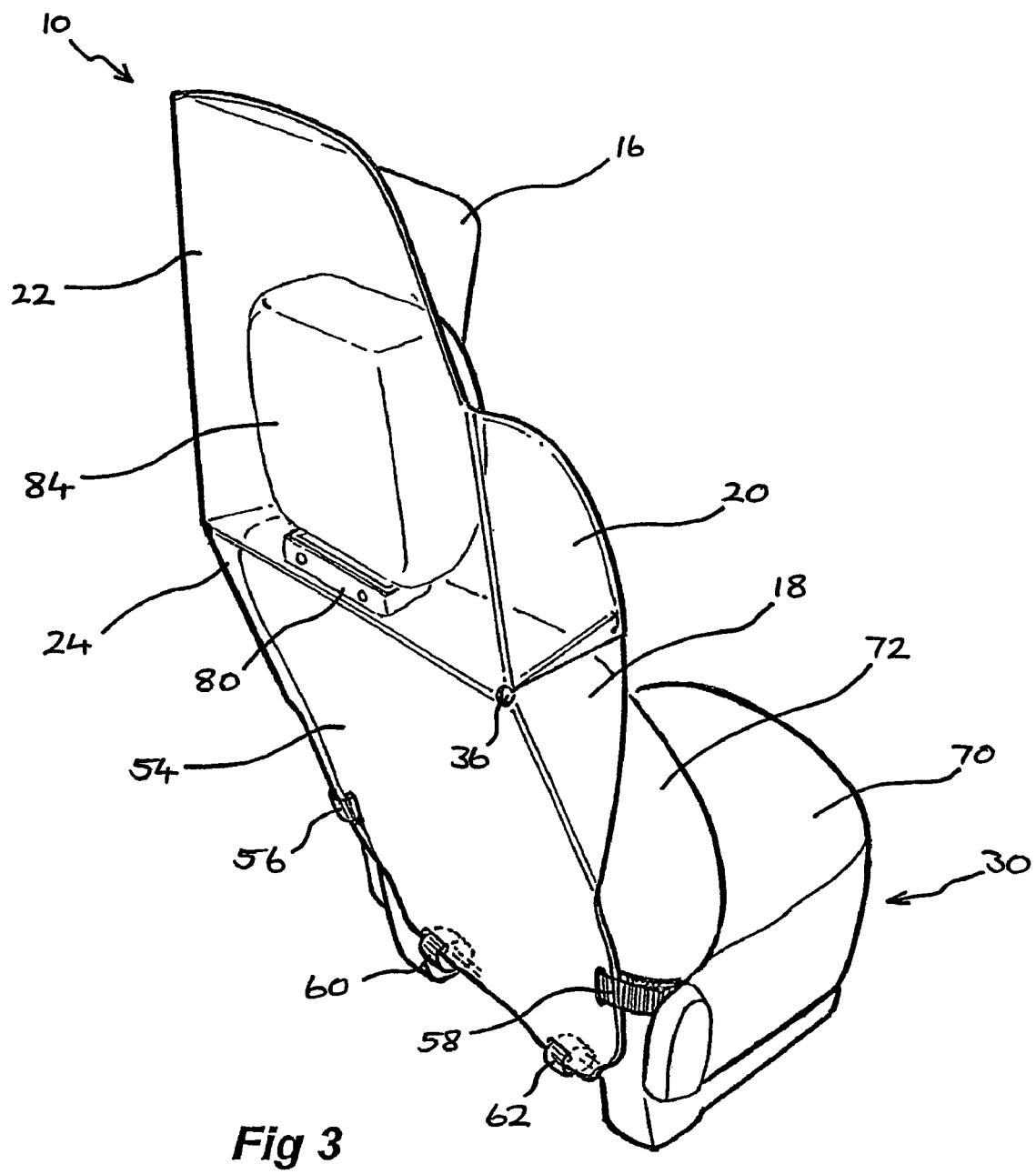
FIG. 3 is a schematic perspective view of the rear of the vehicle driver security screen of FIGS. 1a-b as attached to a driver seat.
Figure 4:
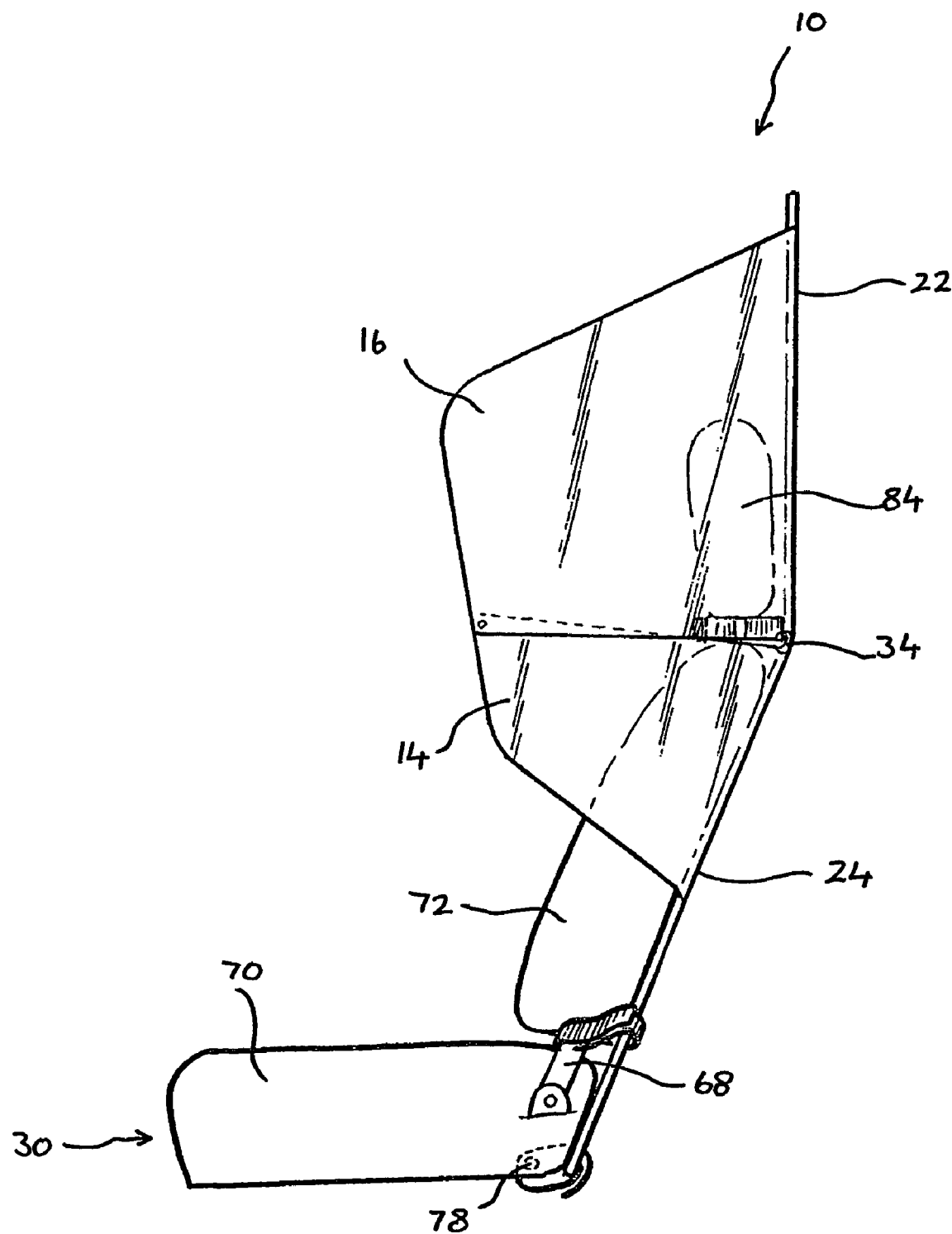
FIG. 4 is a schematic perspective view of the side of the vehicle driver security screen as attached to a driver seat as shown in FIG. 3.
Figure 5:
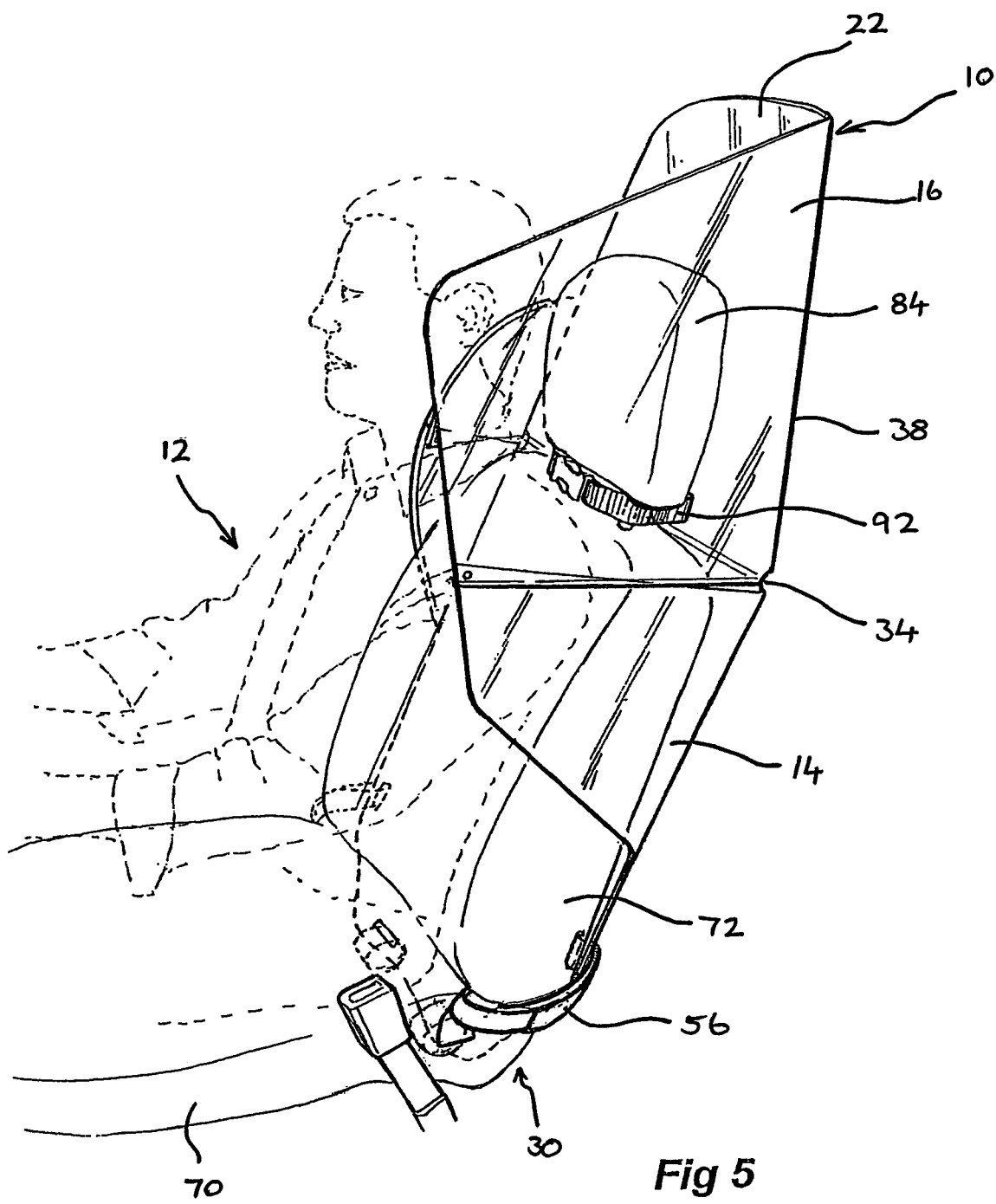
FIG. 5 is a schematic perspective view of the vehicle driver security screen as shown in FIG. 4 and including a driver.

FIGS. 1-2 illustrate the vehicle driver security screen 10 of the present invention whilst FIGS. 3-5 illustrate the screen 10 as attached to the driver seat 30 of a vehicle (not shown). The security screen 10 is a single rigid structure and consists of six panels 14, 16, 18, 20, 22 and 24. It is to be understood that panels 16 and 20 are extensions of panel 22 that have been bent substantially laterally relative to panel 22 whilst panels 14 and 18 are extensions of panel 24 that have been bent at an angle slightly less than that of panels 16 and 20. Panel 22 bends forward relative to the driver 12 and it is this bend that causes panels 16 and 20 to overlap with panels 14 and 18 respectively. It is to be understood that there exists space 34 between panels 14 and 16, and space 36 between panels 18 and 20 to allow for this overlap.

Panel 22 is defined by adjacent edges 38, 40 and 42 and a circular edge 44 whereby panel 16 extends from 38 and panel 20 extends from 42. The overlap of panels 14 and 16, and 18 and 20 are connected by a stud or screw connection 46, or any other suitable connection means. The edges 48 as defined by overlapping panels 14 and 16, and 50 as defined by overlapping panels 18 and 20 are both flush. Panels 18 and 20 together form a curved perimeter that extends outwards from the top of edge 42 and downward toward edge 52. Alternatively, panels 14 and 16 together form a shape with relatively straight edges. As is illustrated clearly in FIG. 5, the driver 12 of the vehicle is still able to maintain sufficient contact with both side and rear passengers in that panel 14 does not block movement of the driver's hands. Therefore, exchange of money and various other activities may still take place. For example, if a taxi-driver 12 was required to give change to a customer seated at their side or at their rear, there is sufficient clearance beneath panel 14 for this to be achieved.

It should now be apparent that when the security screen 10 is attached to a vehicle driver seat 12, that panels 14 and 16 will protect from a side passenger (not shown), panel 22 will protect from any rear passengers and panels 18 and 20 will protect from rear passengers who may wish to assault the driver from the driver door side of the vehicle. Furthermore, the extension of each panel allows for particular protection of the vital regions of the driver 12, namely the head and torso regions.

The vehicle driver security screen 10 as illustrated is intended for vehicles with right hand side steering, however, it is to be understood that the present invention may well be manufactured in an opposite configuration to allow for application in vehicles with left hand side steering.

Panel 24 lies substantially flat across the rear surface 54 of the seat 30 and is adapted to extend to just above the vehicle floor (not shown) while panel 22 is adapted to almost abut the vehicle ceiling liner (not shown). The panel 24 also contains four connection means 56, 58, 60, and 62, in this example being well-known hook and tape connections. The connection means 56 and 58 that extend through apertures 64 and 66 respectively, are adapted to be fastened to the seat frame 68 that connects the base 70 of the seat 12 to the body 72 of the seat 12. The connection means 60 and 62 that extend through apertures 74 and 76 respectively, are adapted to be fastened to a base frame 78 of the seat 30.

Figure 6:
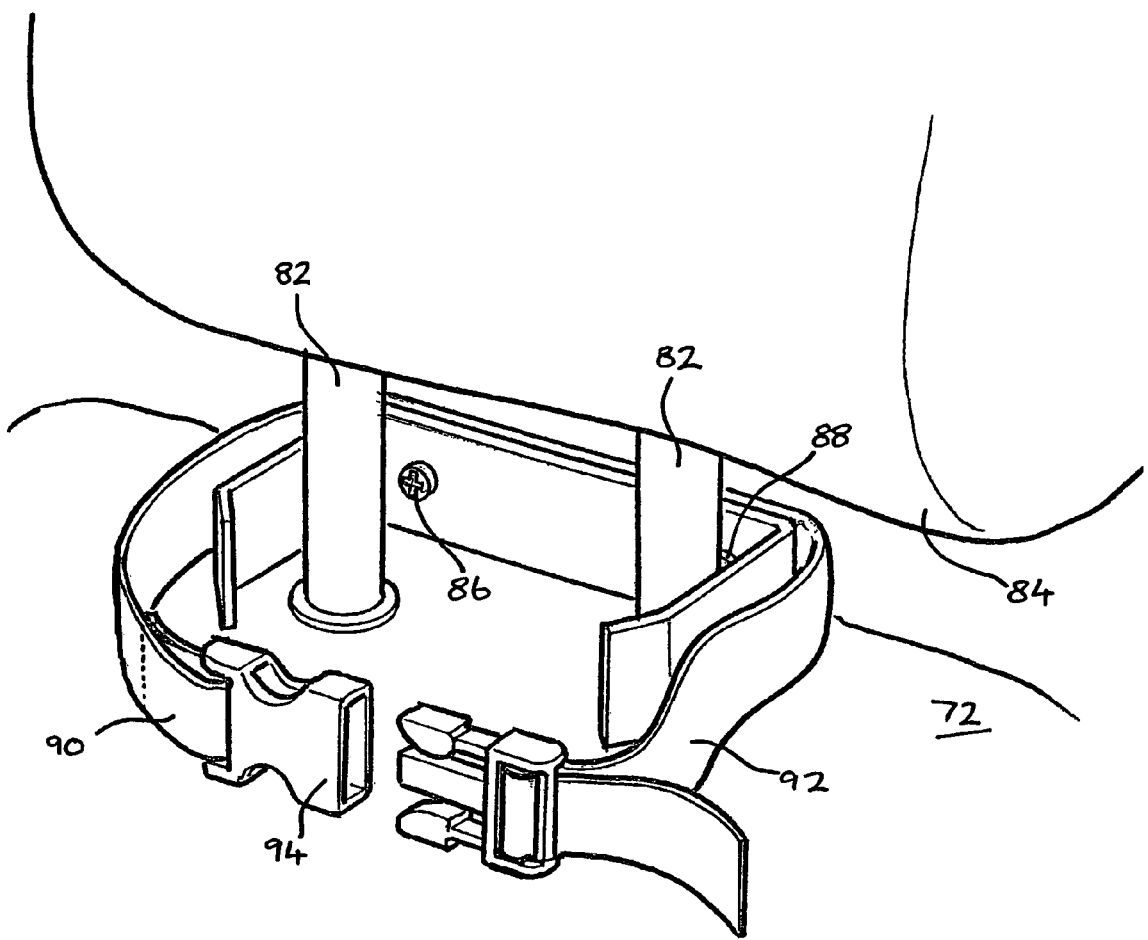
FIG. 6 is an enlarged perspective view of the upper connection means between the vehicle driver security screen and the driver seat.

There exists another connection means 80 on panel 22 that is clearly illustrated in FIG. 6. The connection means 80 is adapted to be attached to the lower portion 82 of a vehicle head-rest 84. The connection means 80 comprises a C-section that is connected to panel 22 through its elongate section 82. Once again, this connection may be achieved using screws 86 and 88 as illustrated, however, this is by way of example only and the present invention should not be limited to this. C-section 80 is adapted to hug portion 82 while straps 90 and 92 allow for this connection to be strengthened. The illustrated straps include a well known snap-fit connection 94, however, other means to connect the straps may well be employed. FIG. 7 illustrates the vehicle driver security screen 10 including its connection means 96 and 98 also incorporating a snap-fit connection.

The connection of the security screen 10 with the vehicle seat 30, as specified above, allows for the driver 12 of the vehicle to adjust his or her seat 30 and coincidentally move the security screen 10 with the seat 30. This provides obvious advantages in that drivers of public transport vehicles often compromise safety for comfort, whereas the present invention offers the availability of both. Furthermore, the narrowness of panel 20 and the clearance below panel 14 provides space for a seatbelt to extend there through, which is a requirement by law in most countries. The seatbelt would therefore extend over panel 20, across the driver's torso and below panel 14 to the seatbelt buckle (not shown). This means that no matter which position the seat 30 is adjusted to, the driver is still able to strap on the seatbelt.

The screen 10 in its maneuverability can also be easily retrofitted into existing public transport vehicles with minimal requirements thus offering the added advantage of low cost.

It should be understood that the method of manufacture of the security screen 10 should not be limited to the above-mentioned process of bending the panels as each panel may well be welded together to produce the same or similar result. Similarly, the overlapping sides do not necessarily have to be employed as single side members will suffice. Typically, the security screen 10 is made of a strong and transparent Polycarbonate plastic, however, once again any material capable of offering adequate protection to the driver may be used. As an indication: the angle of panels 14 and 16, and panels 18 and 20 relative to panel 24 should be bent to approximately 109°; and the larger side of the screen 10, namely panels 14 and 16 should extend to approximately ¾ of the length between the dashboard (not shown) and panel 24.

Figure 8B:
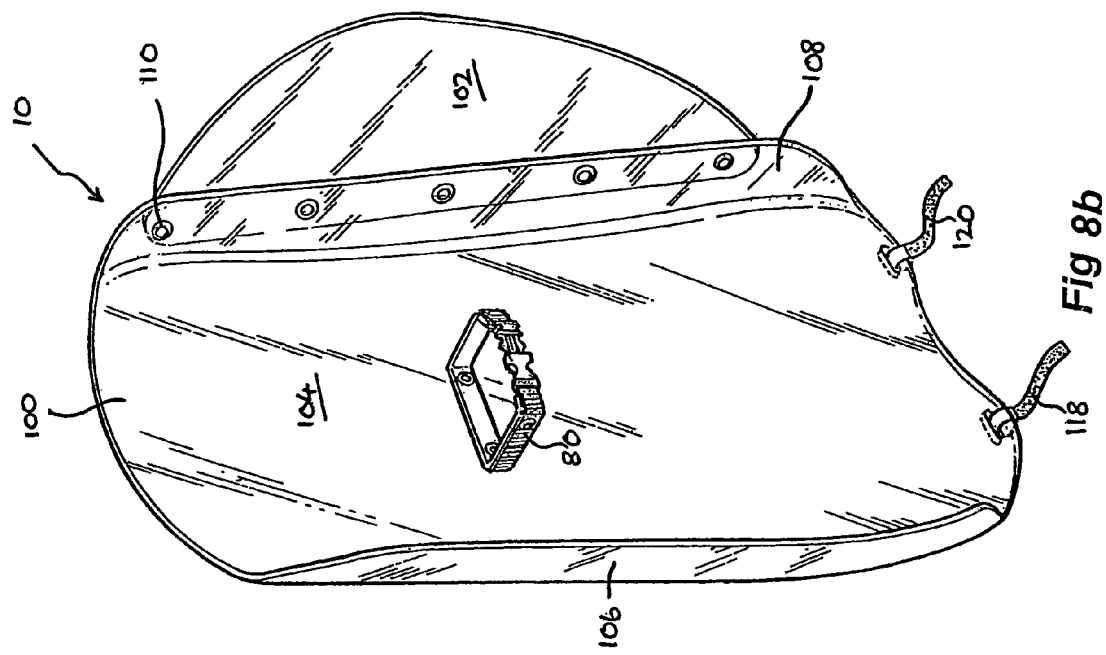
Figure 8A:
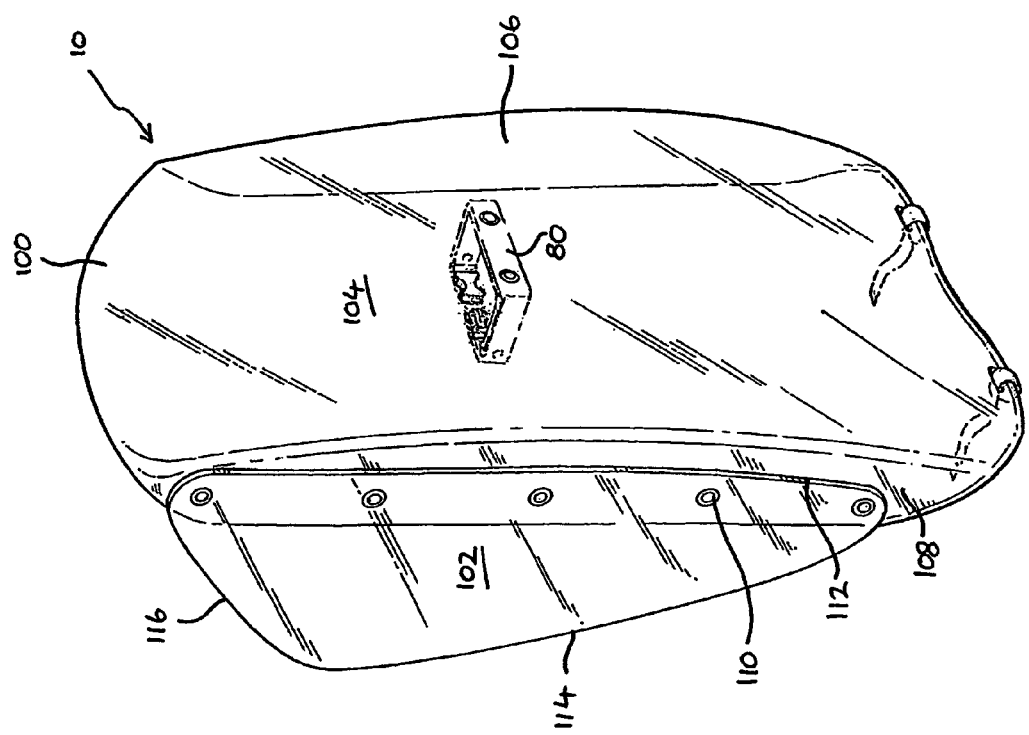
FIG. 8a is a schematic front perspective view of an alternate embodiment of a vehicle driver security screen.

In a further form of the invention and as illustrated in FIGS. 8-9 the security screen 10 can be constructed from two separate sections 100 and 102 of material. As illustrated in FIG. 8a, the larger of the sections 100 is moulded to include a curved rear panel 104 and two sides 106 and 108. Side 108 is attached to section 102 by way of studs or screw connection 110, or any other suitable connection means. Section 102 consists of a substantially planar panel. The panel 102 as illustrated in FIG. 8a includes three sides 112, 114 and 116 that form a scalene triangle. It should however be understood by the skilled addressee that the panel 102 can be of any configuration providing that it protects the driver 12 from assault from the side. The two section construction may be preferred for ease of manufacture or repair.

As illustrated in FIG. 8b a connection means 80 is attached to panel 104 and is adapted to be connected to the lower portion 82 of a vehicle head-rest 84. Panel 104 further includes two straps 118 and 120 which are adapted to connect to seat 30. In this way the security screen 10 is attached to the rear surface of the seat 30.

Figure 9C:
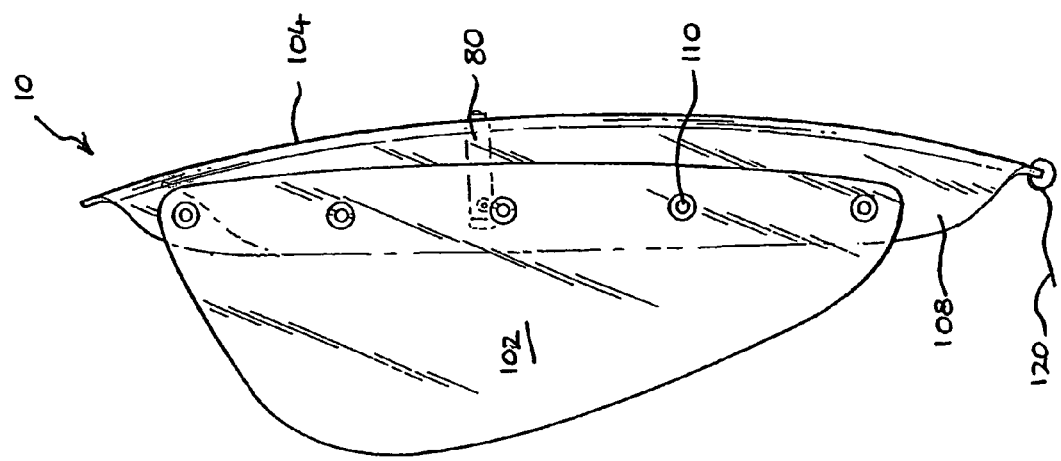
FIG. 9c is a side plan view of the vehicle driver security screen of FIGS. 8a-b illustrating the substantially planar side panel.
Figure 9B:
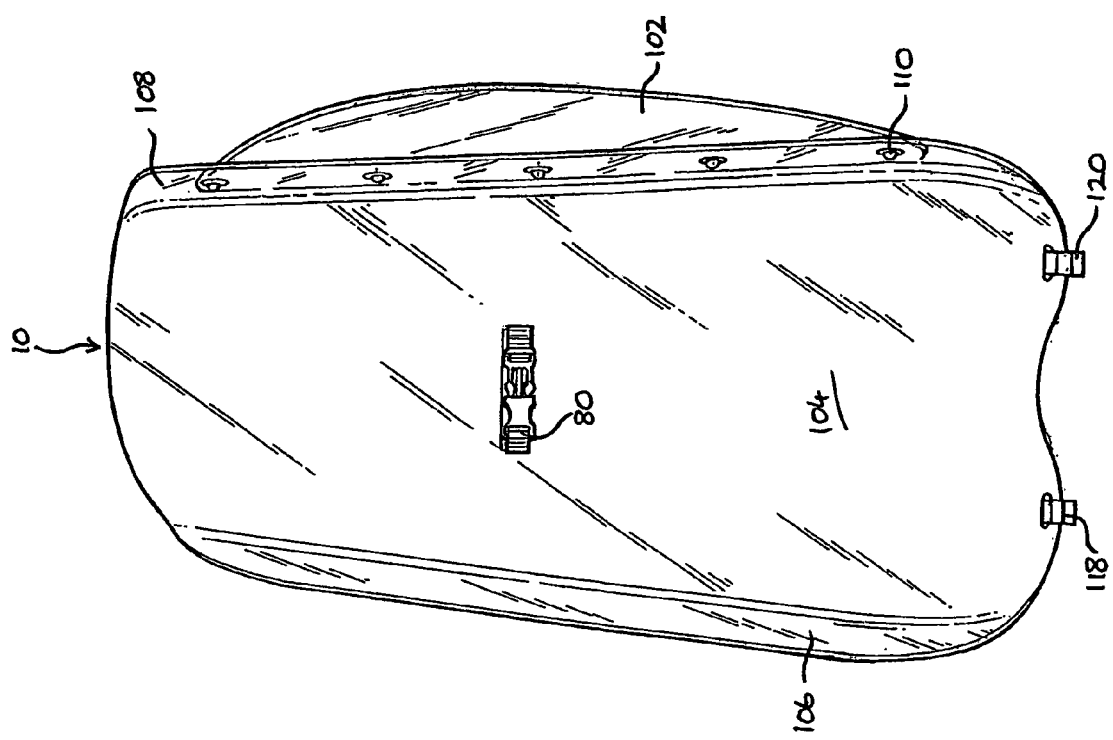
FIG. 9b is a front plan view of the vehicle driver security screen of FIGS. 8a-b.
Figure 9A:
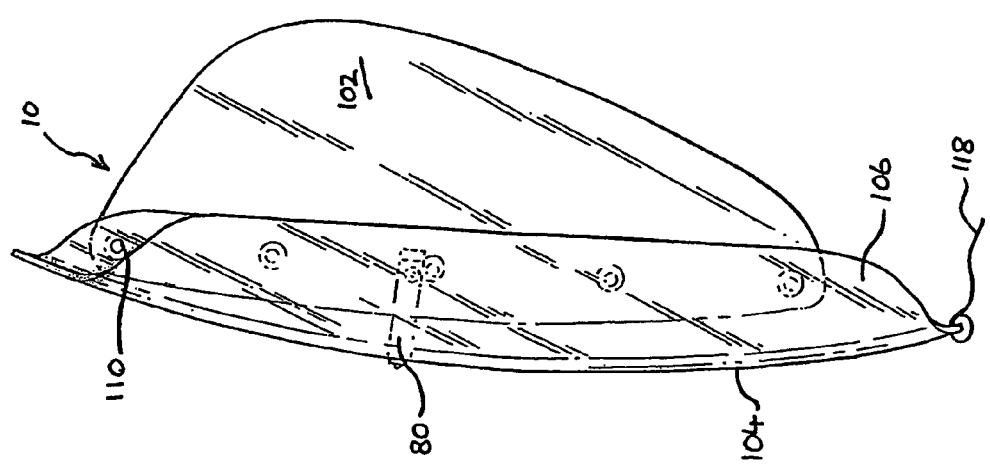
FIG. 9a is a side plan view of the vehicle driver security screen of FIGS. 8a-b.

As further illustrated in FIGS. 9a-9c panel 102 extends forwardly to a greater extent than panel 106. This is to ensure that the driver 12 is adequately protected from persons within the vehicle whist not restricting the driver's ability to access and escape the vehicle.

It should therefore now be apparent to those skilled in the art that the disclosed invention offers protection for a driver of a public transport vehicle from assault. The screen includes side and rear panels that prevent passengers seated beside or behind the driver from accessing the vital regions of the driver such as the head and torso regions, whilst maintaining sufficient contact and communication between driver and passenger. The screen offers various other advantages in that it is able to be retrofitted into existing public transport vehicles and is movable with the driver seat thereby offering the driver both comfort and protection.

The skilled addressee should now appreciate the advantages of the present invention whereby a driver security screen offering protection for the driver can be easily installed into the vehicles and attached to the driver's seat. This results in the panel moving with the seat ensuring that the screen always fits snugly around the driver.

It is to be understood that the embodiment is by way of example only and that other variations may very well be made to the present invention without deviating from its scope. Thus, there may very well only be a rear panel and one passenger side panel, the panels being of a straight configuration. Further the screen may only be attached to the headrest and not to any other locations on the seat.

Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

What is claimed is:

1. A security screen adapted to be attached to a front seat of a vehicle, the seat including a base, backrest, at least one rear surface, at least first and second frames and headrest, said security screen including:
   a lower rear planar section and an adjoining upper rear planar section, the plane of the upper section being different to the lower section;
   said lower rear section having two opposing side barriers extending forwardly from an upper end of said lower rear section;
   said upper rear section having two opposing side barriers extending forwardly above said lower rear section side barriers; and
   at least first attachment means adapted to removable and securably attach said security screen to said seat.

2. The security screen of claim 1, wherein said upper section extends upwardly at a greater vertical angle than said lower rear section.

3. The security screen of claim 1, wherein said security screen, when attached to said seat, does not restrict the movement of said seat.

4. The security screen of claim 1, wherein said upper rear section extends to just below the ceiling of said vehicle.

5. The security screen of claim 1, wherein said first attachment means includes a C-section member adapted to engage said headrest.

6. The security screen of claim 5, wherein said C-section member includes a tether adapted to secure said C-section member to said headrest.

7. The security screen of claim 1, wherein said security screen includes third attachment means adapted to engage said second frame of said seat, said second frame being located below said seat.

8. The security screen of claim 7, wherein said third attachment means includes a hook and tape connection.

9. The security screen of claim 7, wherein said third attachment means includes a snap fit connection.

10. The security screen of claim 1, wherein said first attachment means includes a hook and tape connection.

11. The security screen of claim 1, wherein said first attachment means includes a snap-fit connection.

12. The security screen of claim 1, wherein said upper and lower rear side barriers extend different distances forward relative to a driver of said vehicle.

13. A security screen adapted to be attached to a front seat of a vehicle, the seat including a base, backrest, at least one rear surface, at least first and second frames and headrest, said security screen including:
   a lower rear planar section and an adjoining upper rear planar section, the plane of the upper section being different to the lower section;
   said lower rear section having two opposing side barriers extending forwardly from an upper end of said lower rear section;
   said upper rear section having two opposing side barriers extending forwardly above said lower rear section side barriers, at least a portion of said upper section side barriers overlapping at least a portion of said lower section side barriers;
   securing means to secure said overlapping side barriers to each other; and
   at least first attachment means adapted to removable and securably attach said security screen to said seat.

14. A security screen adapted to be attached to a front seat of a vehicle, the seat including a base, backrest, at least one rear surface, at least first and second frames and headrest, said security screen including:
- a lower rear planar section and an adjoining upper rear planar section, the plane of the upper section being different to the lower section;
- said lower rear section having two opposing side barriers extending forwardly from an upper end of said lower rear section;
- said upper rear section having two opposing side barriers extending forwardly above said lower rear section side barriers; and
- at least first attachment means adapted to removable and securably attach said security screen to seat backrest, whereby said lower rear planar section makes contact with said rear surface of said seat.

15. A security screen adapted to be attached to a front seat of a vehicle, the seat including a base, backrest, at least one rear surface, at least first and second frames and headrest, said security screen including:
- lower rear planar section and an adjoining upper rear planar section, the plane of the upper section being different to the lower section;
- said lower rear section having two opposing side barriers extending forwardly from an upper end of said lower rear section;
- said upper rear section having two opposing side barriers extending forwardly above said lower rear section side barriers;
- at least first attachment means adapted to removable and securably attach said security screen to said seat; and
- second attachment means adapted to engage said first frame of said seat, said first frame connecting said base and backrest portions of said seat.

16. A security screen adapted to be attached to a front seat of a vehicle, the seat including a base, backrest, at least one rear surface, at least first and second frames and headrest, said security screen including:
- a lower rear planar section and an adjoining upper rear planar section, the plane of the upper section being different to the lower section;
- said lower rear section having two opposing side barriers extending forwardly from an upper end of said lower rear section;
- said upper rear section having two opposing side barriers extending forwardly above said lower rear section side barriers;
- at least first attachment means adapted to removable and securably attach said security screen to said seat; and
- second attachment means adapted to engage said first frame of said seat, said first frame connecting said base and backrest portions of said seat, said second attachment means including a hook and tape connection.

17. A security screen adapted to be attached to a front seat of a vehicle, the seat including a base, backrest, at least one rear surface, at least first and second frames and headrest, said security screen including:
- a lower rear planar section and an adjoining upper rear planar section, the plane of the upper section being different to the lower section;
- said lower rear section having two opposing side barriers extending forwardly from an upper end of said lower rear section;
- said upper rear section having two opposing side barriers extending forwardly above said lower rear section side barriers;
- at least first attachment means adapted to removable and securably attach said security screen to said seat; and
- second attachment means adapted to engage said first frame of said seat, said first frame connecting said base and backrest portions of said seat, said second attachment means including a snap fit connection.

* * * * *